(12) United States Patent
Hoover (10) Patent No.: US 11,577,839 B2
(45) Date of Patent: Feb. 14, 2023

(54) SIDE TO SIDE TILTING AIRCRAFT SEAT MECHANISM

(71) Applicant: AMI Industries, Inc., Colorado Springs, CO (US)

(72) Inventor: Douglas E. Hoover, Colorado Springs, CO (US)

(73) Assignee: AMI Industries, Inc., Colorado Springs, CO (US)

( * ) Notice: Subject to any disclaimer, the term of this patent is extended or adjusted under 35 U.S.C. 154(b) by 254 days.

(21) Appl. No.: 16/985,226

(22) Filed: Aug. 5, 2020

(65) Prior Publication Data

US 2022/0041285 A1  Feb. 10, 2022

(51) Int. Cl.
   *B64D 11/06*  (2006.01)
(52) U.S. Cl.
   CPC ........ *B64D 11/064* (2014.12); *B64D 11/0648* (2014.12)
(58) Field of Classification Search
   CPC .............. B64D 11/064; B64D 11/0648; B64D 11/0691; B60N 2/10; B60N 2/12; B60N 2/2875; B60N 2/39; B60N 2/02; A47C 1/03255; A47C 3/026
   USPC .......................................... 297/314, 165, 167
   See application file for complete search history.

(56) References Cited

U.S. PATENT DOCUMENTS

| | | | | |
|---|---|---|---|---|
| 2,731,074 A | * | 1/1956 | Steinle ..................... | B60N 2/39 248/397 |
| 3,583,758 A | | 6/1971 | Radford | |
| 3,632,076 A | * | 1/1972 | Rogers, Jr. ............... | B60N 2/39 248/371 |
| 3,713,617 A | * | 1/1973 | Bogdan .................. | B60N 2/525 248/371 |
| 4,183,492 A | * | 1/1980 | Meiller .................... | B60N 2/02 248/395 |
| 4,500,062 A | * | 2/1985 | Sandvik .................. | B60N 2/39 248/371 |
| 4,515,337 A | | 5/1985 | Torras | |

(Continued)

FOREIGN PATENT DOCUMENTS

| EP | 1975063 A2 | 10/2008 |
|---|---|---|
| EP | 2899063 A1 | 7/2015 |

(Continued)

OTHER PUBLICATIONS

Extended Search Report for European Application No. 21189630.3 dated Jan. 4, 2022, 6 pages.

*Primary Examiner* — Joshua J Michener
*Assistant Examiner* — Arfan Y. Sinaki
(74) *Attorney, Agent, or Firm* — Suiter Swantz pc llo (57) ABSTRACT

An aircraft seat includes infinitely adjustable, lateral tilt control within a specified range. The aircraft seat includes a stationary support, a tilting frame rotatably or translatably attached to the stationary base, and a tilt control mechanism to adjust the tilt within the defined range and positively lock the frame without back-driving. The tilt control mechanism may include a plurality of linkages connected to the stationary support and the tilting frame, and to each other via a threaded block; a threaded shaft adjusts the linkages and thereby adjust the tilt. Alternatively, the tilt control mechanism comprises a curved rack and a pinion. The threaded block and threaded shaft, or the rack and pinion define ACME threads to prevent back-driving.

6 Claims, 9 Drawing Sheets

(56) References Cited

U.S. PATENT DOCUMENTS

| | | | |
|---|---|---|---|
| 6,026,920 A | 2/2000 | Obeda et al. | |
| 6,382,724 B1* | 5/2002 | Piretti | A47C 1/03261 |
| | | | 297/303.3 |
| 6,398,293 B1* | 6/2002 | Nystrom | B62D 33/0604 |
| | | | 296/190.04 |
| 7,100,983 B1* | 9/2006 | Gant | A47C 3/025 |
| | | | 248/656 |
| 9,452,691 B2 | 9/2016 | Löfstrand | |
| 2001/0000939 A1* | 5/2001 | Roslund, Jr. | A47C 1/03266 |
| | | | 297/303.3 |
| 2004/0195881 A1* | 10/2004 | Wells | A47C 1/03255 |
| | | | 297/262.1 |
| 2006/0192052 A1* | 8/2006 | Baumann | B64D 11/06 |
| | | | 244/122 R |
| 2012/0267503 A1 | 10/2012 | Gribble | |
| 2013/0001995 A1* | 1/2013 | Garvis | G09B 9/12 |
| | | | 297/314 |
| 2019/0045928 A1* | 2/2019 | Yajima | A47C 7/004 |
| 2020/0108751 A1 | 4/2020 | Dotzler et al. | |

FOREIGN PATENT DOCUMENTS

| | | |
|---|---|---|
| EP | 2431218 B1 | 3/2016 |
| EP | 3517434 A1 | 7/2019 |
| ES | 2184564 B1 | 8/2004 |
| GB | 755171 A | 8/1956 |
| GB | 1327027 A | 8/1973 |
| GB | 2438826 A | 12/2007 |

\* cited by examiner

SIDE TO SIDE TILTING AIRCRAFT SEAT MECHANISM

BACKGROUND

Aircraft seating configurations, such as for certain military aircraft, may be oriented with crew member seats facing the side of the aircraft. In such situations, crew members are oriented with the side of their bodies (left or right) facing the direction of aircraft travel. As the aircraft pitches up and down, crew members may be placed in uncomfortable stress positions of supporting their weight against a lateral force with no or limited support.

SUMMARY

In one aspect, embodiments of the inventive concepts disclosed herein are directed to an aircraft seat with infinitely adjustable, lateral tilt control within a specified range. The aircraft seat includes a stationary support, a tilting frame rotatably or translatably attached to the stationary base, and a tilt control mechanism to adjust the tilt within the defined range and positively lock the frame without back-driving.

In a further aspect, the tilt control mechanism comprises a plurality of linkages connected to the stationary support and the tilting frame, and to each other via a threaded block. The threaded block is translated via a threaded shaft to adjust the linkages and thereby adjust the tilt. Alternatively, the tilt control mechanism comprises a curved rack and a pinion.

In a further aspect, the threaded block and threaded shaft, or the rack and pinion define ACME threads to prevent back-driving.

It is to be understood that both the foregoing general description and the following detailed description are exemplary and explanatory only and should not restrict the scope of the claims. The accompanying drawings, which are incorporated in and constitute a part of the specification, illustrate exemplary embodiments of the inventive concepts disclosed herein and together with the general description, serve to explain the principles.

BRIEF DESCRIPTION OF THE DRAWINGS

The numerous advantages of the embodiments of the inventive concepts disclosed herein may be better understood by those skilled in the art by reference to the accompanying figures in which.

DETAILED DESCRIPTION

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to an aircraft seat with infinitely adjustable, lateral tilt control within a specified range. The aircraft seat includes a stationary support, a tilting frame rotatably or translatably attached to the stationary base, and a tilt control mechanism to adjust the tilt within the defined range and positively lock the frame without back-driving.

Figure 1A:
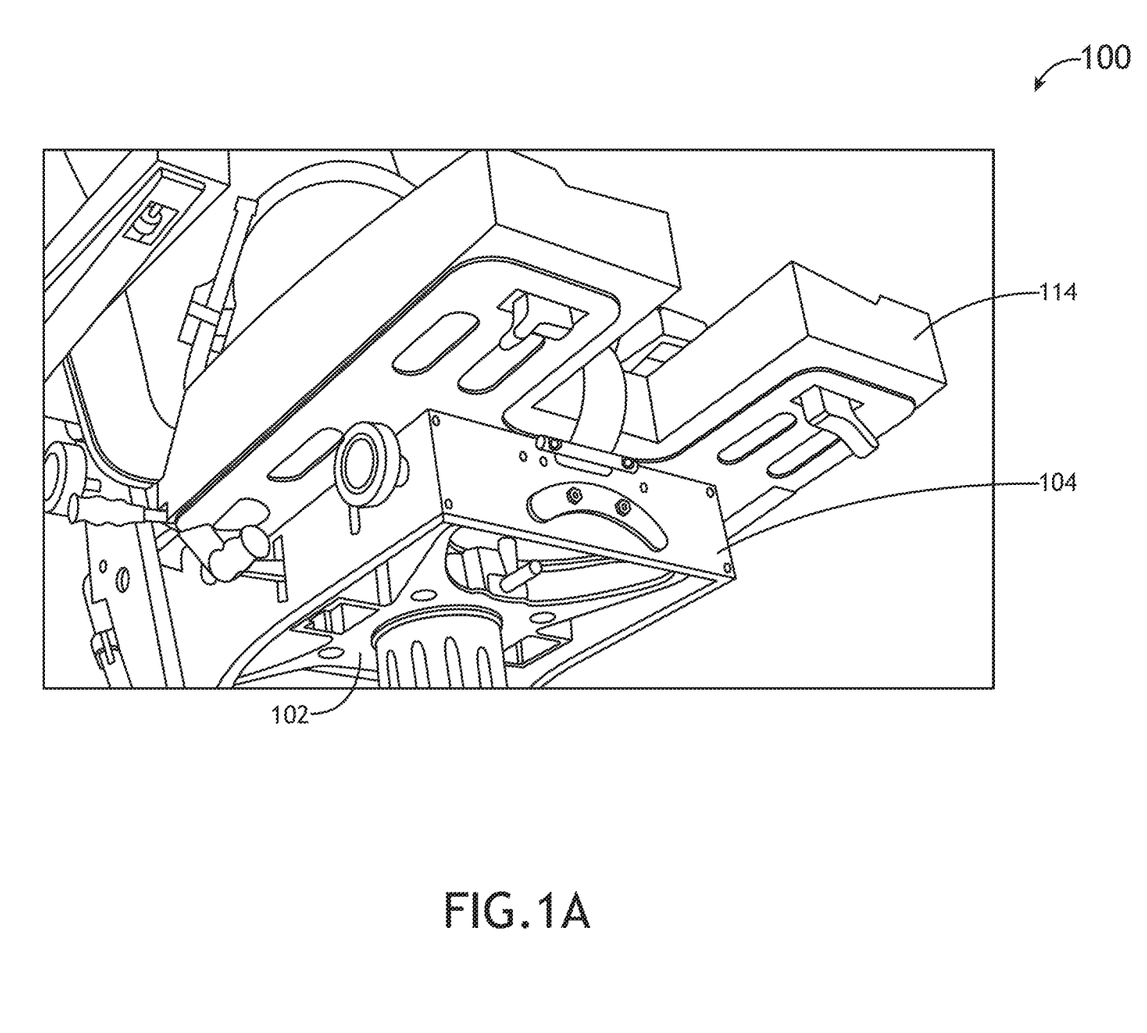
FIG. 1A shows a perspective view of an aircraft seat according to an exemplary embodiment.
Figure 1B:
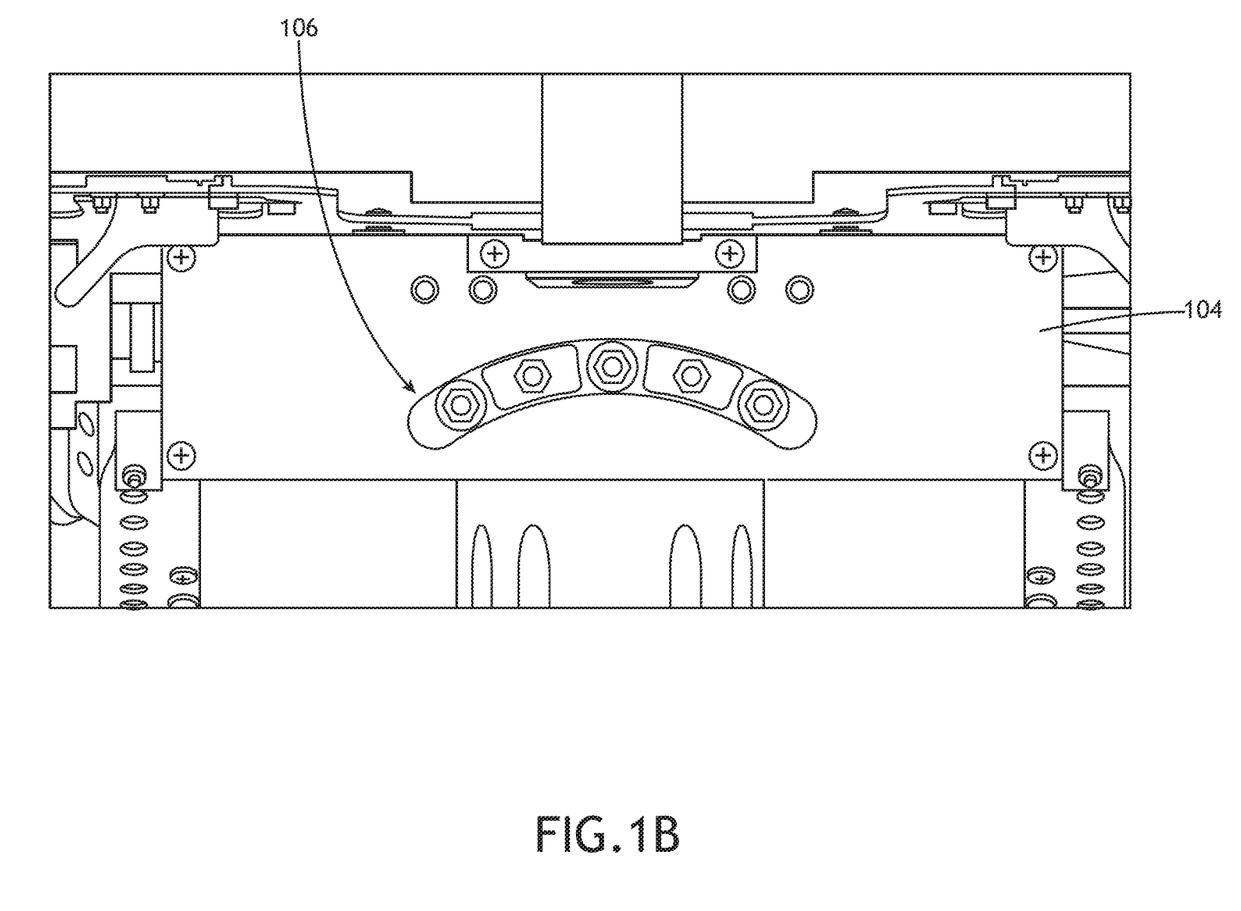
FIG. 1B shows a front view of an aircraft seat frame according to an exemplary embodiment.
Figure 1C:
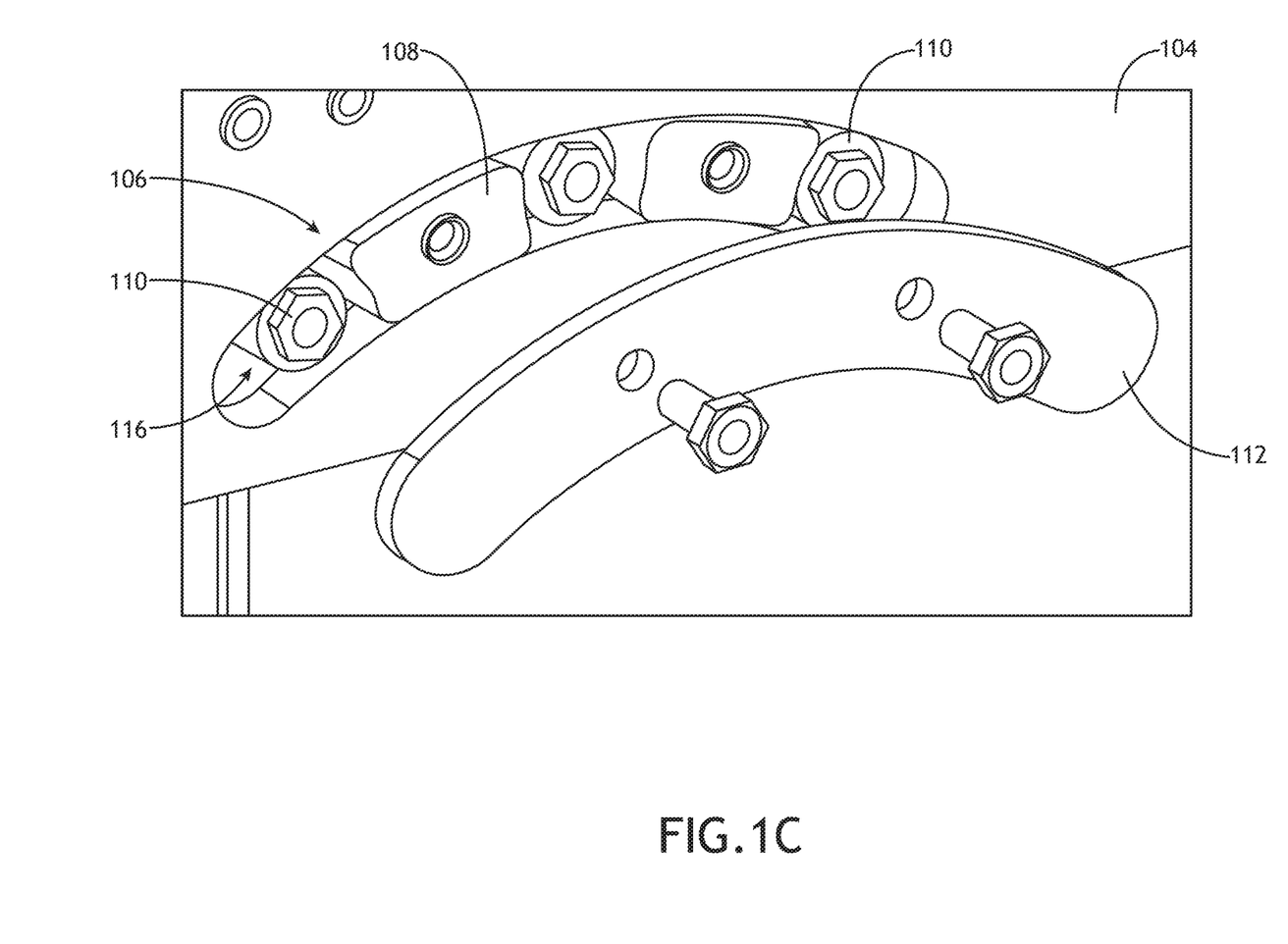
FIG. 1C shows a partial, exploded, perspective view of an aircraft seat frame according to an exemplary embodiment.

Referring to FIGS. 1A-1C, a perspective view of an aircraft seat 100, and front and partial exploded views of an aircraft seat frame 104 according to an exemplary embodiment are shown. The aircraft seat 100 comprises a stationary support 102 that may be affixed the aircraft. A separate frame 104 is attached to the stationary support 102 via one or more connection elements 106 that allows rotation or angular translation of the frame 104 with respect to the stationary support 102.

In at least one embodiment, the connection elements 106 may comprise a bolt, trunnion, or other pivotable element. Alternatively, the connection elements 106 may comprise one or more trunnions 110 or rollers disposed to travel within a curved channel 116. For example, the frame 104 may define a curved channel 116 and the connection element 106 may include the one or more trunnions 110 or rollers. The frame 104 would move within a range defined by gaps between the lateral edges of the curved channel 116 and the nearest trunnion 110 or roller. In at least one embodiment, the connection element 106 may also include one or more support elements 108 that at least partially support the load of the frame 104 and attached seat 114. In at least one embodiment, a cover plate 112 may be disposed to conceal and protect the connection element 106.

It may be appreciated that it is desirable to prevent back-driving once the frame 104 is tilted to a desired angle. In at least one embodiment, the support elements 108 provide secondary off-loading features in the event that the downward load on stationary support 102 becomes so great that the rollers 110 begin to bend and need additional support to prevent frame 104 from losing engagement to stationary support 102. During normal use, the support elements 108 would not contact surfaces of the curved channel 116. Back-driving prevention is accomplished in part by the friction between the rack and pinion.

Figure 2A:
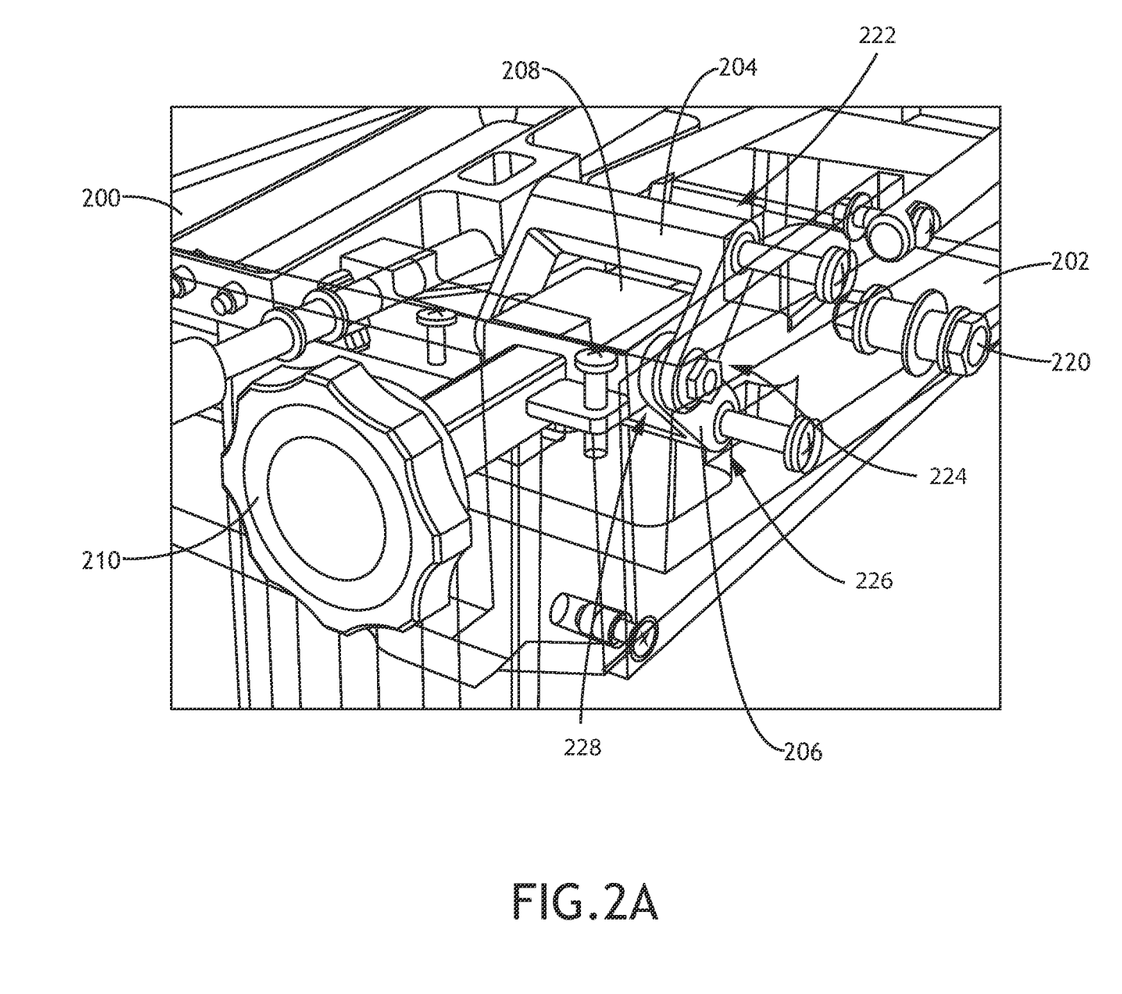
FIG. 2A shows a partial, perspective view of an aircraft seat tilting control mechanism according to an exemplary embodiment.
Figure 2B:
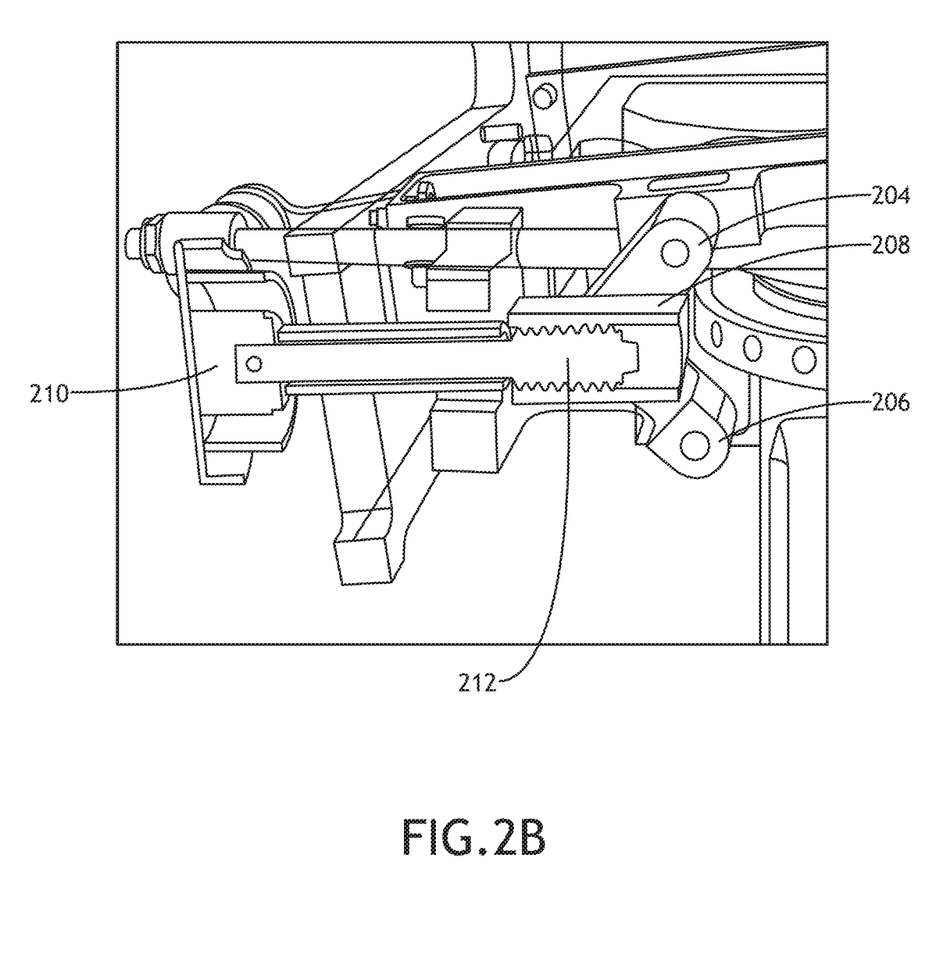
FIG. 2B shows a front, partial, cross-sectional view of an aircraft seat tilting control mechanism according to an exemplary embodiment.
Figure 2C:
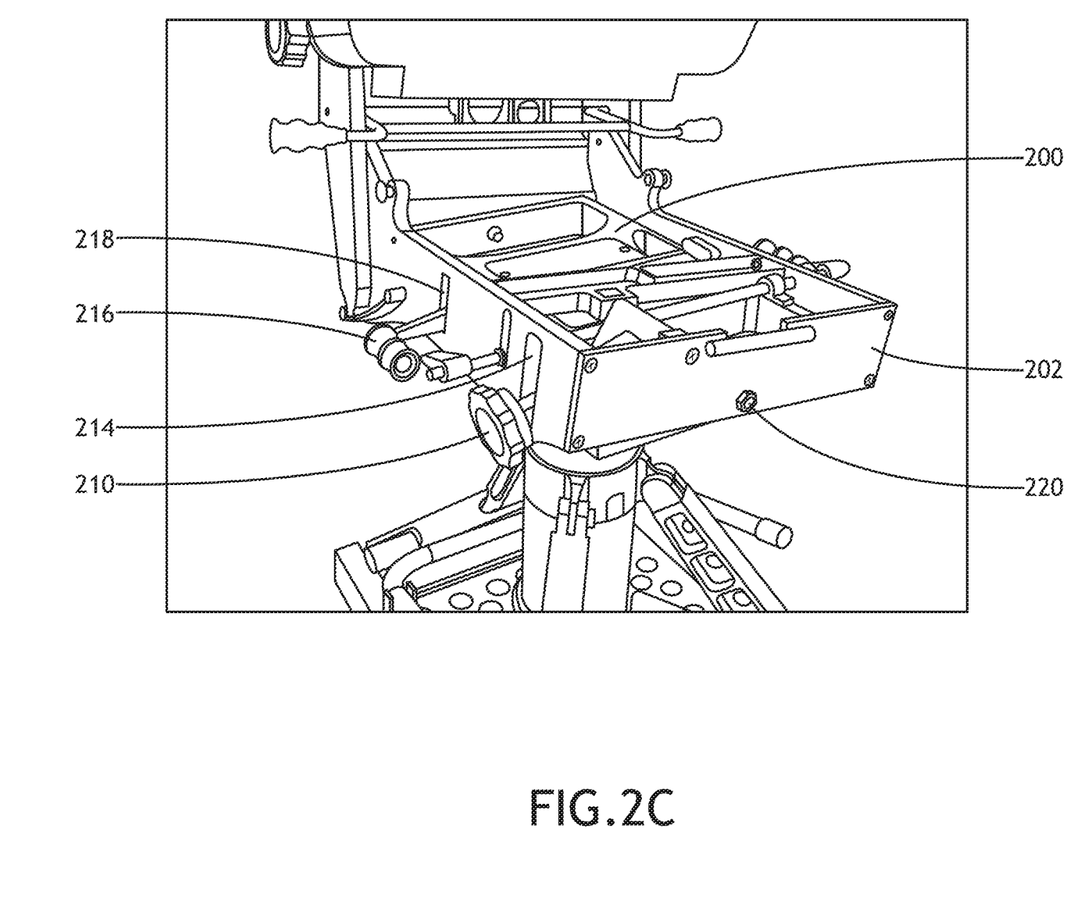
FIG. 2C shows a perspective view of an aircraft seat according to an exemplary embodiment.

Referring to FIGS. 2A-2C, a partial, perspective view; and a front, partial, cross-sectional view of an aircraft seat tilting control mechanism; and a perspective view of an aircraft seat according to an exemplary embodiment are shown. Where the aircraft seat includes a stationary support 200 affixed to the aircraft and a frame 202 connected to the stationary support 200 via one or more connection elements 220 configured to allow rotation or angular translation, the frame 202 may be infinitely adjustable within a range of tilting angles via a tilt control mechanism.

In at least one embodiment, the tilt control mechanism may comprise a system having a first linkage 204 connected to the frame 202 at a first end 222, a second linkage 206 connected to the stationary support 200 at a first end 226, and a threaded block 208 connected to both the first linkage 204 at a second end 224 and the second linkage 206 at a second end 228.

A rotatable control shaft 210 having a threaded portion 212 configured to engage the threaded block 208 may be held in a fixed position relative to the stationary support 200. As the control shaft 210 is rotated (for example, via a knob), the threaded block 208 is translated linearly, thereby increasing or decreasing the distance between the first ends 222, 226 of the first linkage 204 and the second linkage 206. Because the first linkage 204 and second linkage 206 are disposed some distance from the connection element 220, the distance between the first ends 222, 226 corresponds to a tilt angle.

In at least one embodiment, the threaded block 208 and threaded portion 212 of the control shaft 210 define trapezoidal ACME threads. ACME threads provide a thread angle that prevents back-driving via increased friction between thread flanks.

In at least one embodiment, certain aircraft seat controls 216 are fixed relative to the stationary support 200 but also need to pass through the frame 202. Each such aircraft seat control 216 may correspond to an elongated opening 214, 218 in the frame 202 to allow the frame 202 to move within the defined range around the aircraft seat controls 216.

Figure 3A:
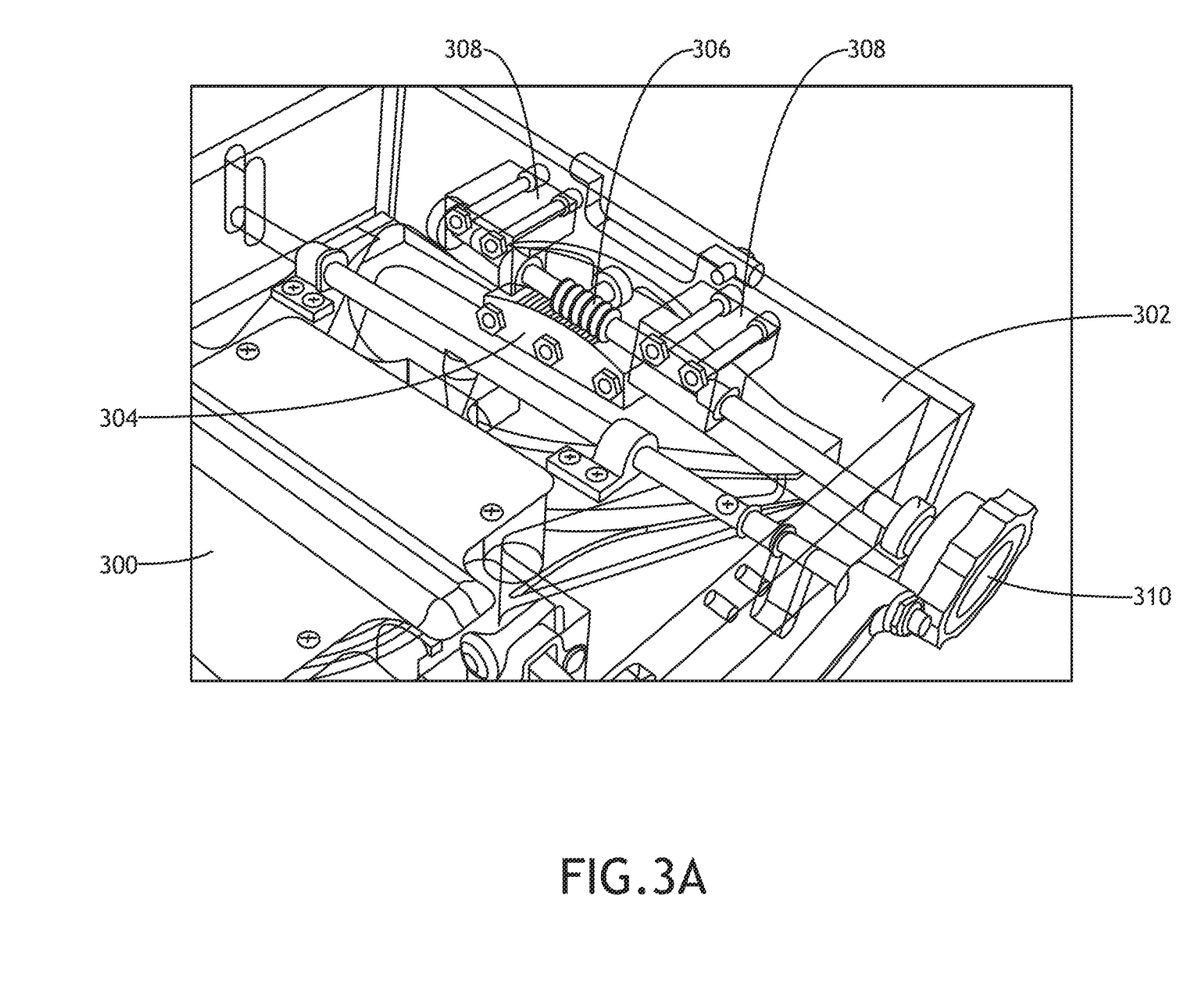
FIG. 3A shows a perspective view of an aircraft seat tilting control mechanism according to an exemplary embodiment.
Figure 3B:
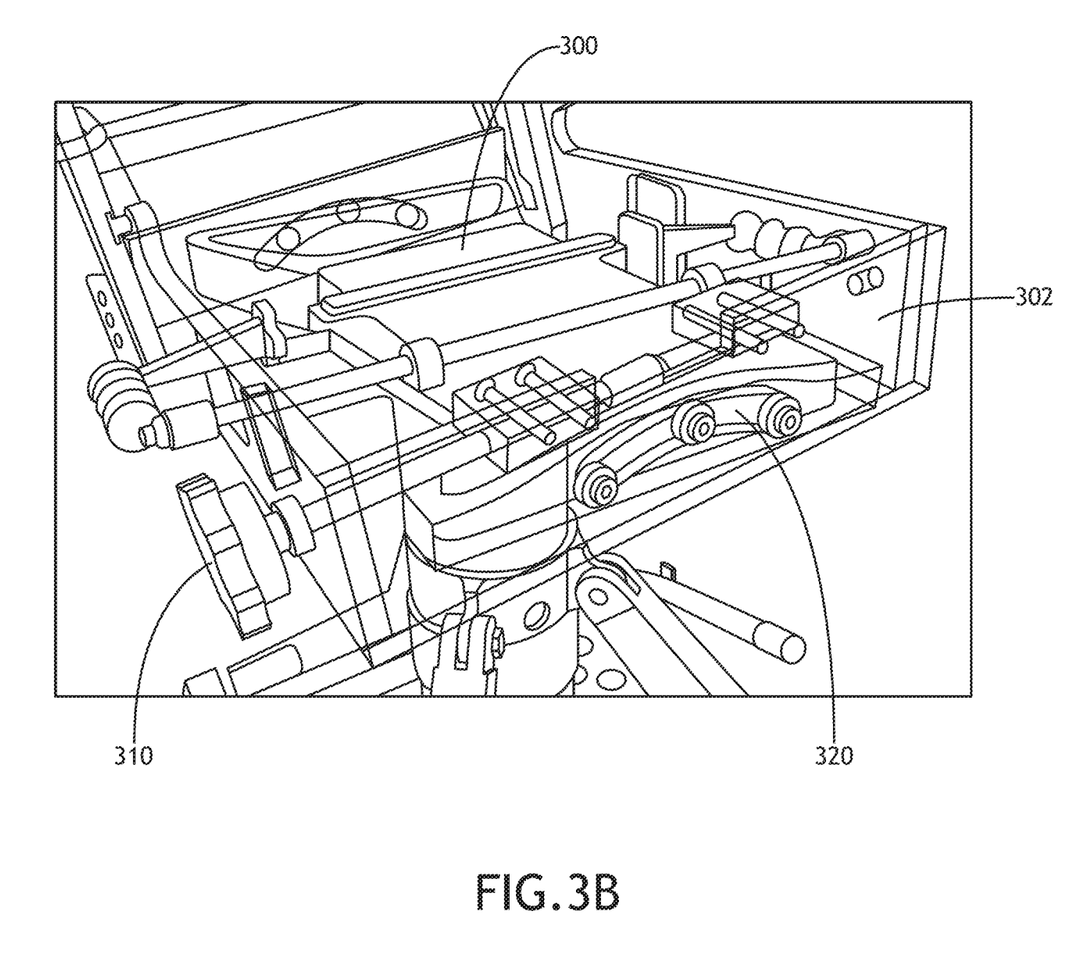
FIG. 3B shows a perspective view of an aircraft seat tilting control mechanism according to an exemplary embodiment.
Figure 3C:
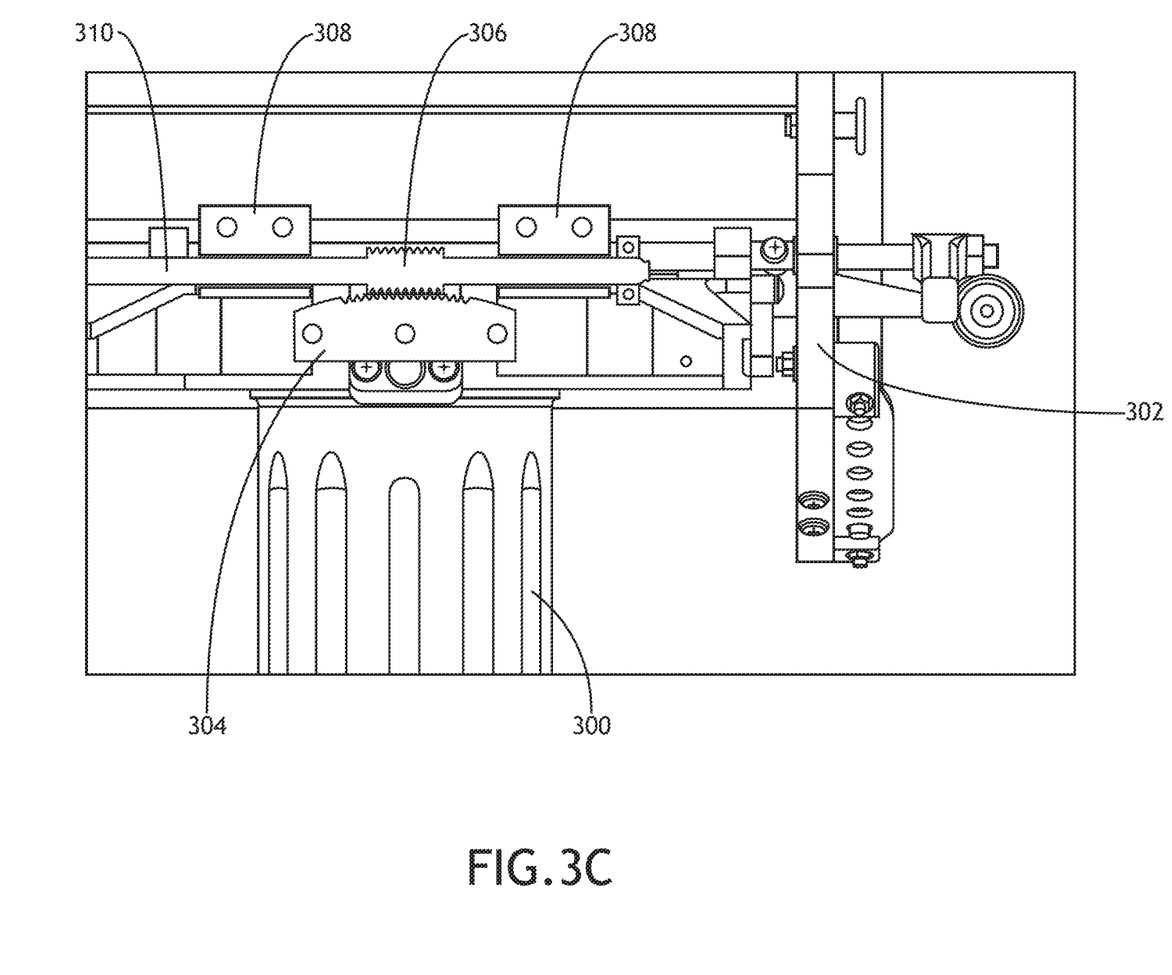
FIG. 3C shows a front, cross-sectional view of an aircraft seat tilting control mechanism according to an exemplary embodiment.

Referring to FIGS. 3A-3C, perspective views and a front, cross-sectional view of an aircraft seat tilting control mechanism according to an exemplary embodiment are shown. Where the aircraft seat includes a stationary support 300 affixed to the aircraft and a frame 302 connected to the stationary support 300 via one or more connection elements 320, each comprising a curved channel defined by the frame 302 and one or more rollers affixed to the stationary support 300, the frame 302 may be infinitely adjustable within a range of tilting angles via a tilt control mechanism. In at least one embodiment, two connection elements 320 connect the stationary support 300 to the frame 302; a first connection element 320 disposed at a front interface and a second connection element 320 disposed at a rear interface, both configured to move about the same axis. The tilt range of the frame 302 is defined by a gap between the lateral termini of the curved channel and the nearest corresponding roller.

In at least one embodiment, the tilt control mechanism may comprise a curved rack 304 and a control shaft 310 having a corresponding pinion 306. In at least one embodiment, the curved rack 304 is affixed to the stationary support 300 and the control shaft 310 is rotatably affixed to the frame 302 via one or more shaft supports 308 such that the pinion 306 is maintained in contact with the rack 304 over the entire tilt range as defined by the connection element 320. The tilt angle may be set by turning the control shaft 310 via a knob or some other adjusting mechanism.

In at least one embodiment, the rack 304 and pinion 306 define trapezoidal ACME threads. ACME threads provide a thread angle that prevents back-driving via increased friction between thread flanks. In at least one embodiment, the pinion lead is no more than thirty-three percent (33%) of the pinion diameter; such ratio prevents undesirable back-driving.

When an aircraft is pitching up or down, the crew members in the side facing seats will be rotated sideways, placing them in an irregular orientation which can hinder in-flight performance. Embodiments of the present disclosure allow the aircraft seat to tilt in the opposite direction of the pitching direction to compensate and keep the crew member level.

It is believed that the inventive concepts disclosed herein and many of their attendant advantages will be understood by the foregoing description of embodiments of the inventive concepts disclosed, and it will be apparent that various changes may be made in the form, construction, and arrangement of the components thereof without departing from the broad scope of the inventive concepts disclosed herein or without sacrificing all of their material advantages; and individual features from various embodiments may be combined to arrive at other embodiments. The form herein before described being merely an explanatory embodiment thereof, it is the intention of the following claims to encompass and include such changes. Furthermore, any of the features disclosed in relation to any of the individual embodiments may be incorporated into any other embodiment.

What is claimed is:

1. An aircraft seat comprising:
   a stationary support;
   a tilting frame; and
   a tilt control mechanism comprising:
      a first linkage;
      a second linkage;
      a threaded block; and
      a threaded shaft,
   wherein:
      the stationary support and tilting frame are connected and configured to translate from a left tilting orientation to a right tilting orientation;
      the first linkage is connected to the stationary support at a first end and the threaded block at a second end;
      the second linkage is connected to the tilting frame at a first end and the threaded block at a second end; and
      the threaded shaft is configured to engage the threaded block and translate the threaded block from a first orientation wherein the first end of the first linkage and the first end of the second linkage are distally disposed to a second orientation wherein the first end of the first linkage and the first end of the second linkage are proximally disposed.

2. The aircraft seat of claim 1, wherein the threaded block and threaded shaft each define ACME threads.

3. The aircraft seat of claim 1, wherein the tilting frame defines at least one chair control channel disposed to allow a corresponding chair control to pass through, and allow the tilting frame to tilt while the corresponding chair control remains stationary relative to the stationary support.

4. An aircraft seat tilting mechanism comprising:
   a stationary support;
   a tilting frame; and
   a tilt control mechanism comprising:
      a first linkage;
      a second linkage;
      a threaded block; and
      a threaded shaft,
   wherein:
      the stationary support and tilting frame are connected and configured to translate from a left tilting orientation to a right tilting orientation;
      the first linkage is connected to the stationary support at a first end and the threaded block at a second end;
      the second linkage is connected to the tilting frame at a first end and the threaded block at a second end; and
      the threaded shaft is configured to engage the threaded block and translate the threaded block from a first orientation wherein the first end of the first linkage and the first end of the second linkage are distally disposed to a second orientation wherein the first end of the first linkage and the first end of the second linkage are proximally disposed.

5. The aircraft seat tilting mechanism claim 4, wherein the threaded block and threaded shaft each define ACME threads.

6. The aircraft seat tilting mechanism claim 4, wherein the tilting frame defines at least one chair control channel disposed to allow a corresponding chair control to pass through, and allow the tilting frame to tilt while the corresponding chair control remains stationary relative to the stationary support.

\* \* \* \* \*